United States Patent [19]

Genheimer et al.

[11] Patent Number: 4,862,298

[45] Date of Patent: Aug. 29, 1989

[54] SHOCK LOAD DETECTION DEVICE

[75] Inventors: Stephen R. Genheimer; Ken L. Pottebaum, both of Yukon, Okla.

[73] Assignee: Magnetic Peripherals Inc., Minneapolis, Minn.

[21] Appl. No.: 167,072

[22] Filed: Mar. 11, 1988

[51] Int. Cl.[4] ........................ G11B 15/04; G11B 5/012

[52] U.S. Cl. .......................................... 360/60; 360/75

[58] Field of Search ................. 360/60, 104, 128, 137, 360/75

[56] References Cited

U.S. PATENT DOCUMENTS

| | | | |
|---|---|---|---|
| 3,137,834 | 6/1964 | Pfann | 338/6 |
| 3,304,787 | 2/1967 | Chiku et al. | 73/517 |
| 3,363,471 | 1/1968 | Lovelace et al. | 73/517 |
| 3,853,000 | 12/1974 | Barnett et al. | 73/88.5 R |
| 4,040,103 | 8/1977 | White | 360/75 |
| 4,088,907 | 5/1978 | Jones et al. | 310/333 |
| 4,430,895 | 2/1984 | Colton | 73/497 |
| 4,498,025 | 2/1985 | Takahashi | 310/312 |
| 4,644,181 | 2/1987 | Mosconi et al. | 361/119 |
| 4,658,175 | 4/1987 | Albert | 310/323 |
| 4,672,475 | 6/1987 | Nakasho | 360/60 |

*Primary Examiner*—Vincent P. Canney
*Assistant Examiner*—Kevin J. Fournier
*Attorney, Agent, or Firm*—Edward P. Heller, III; Bill D. McCarthy

[57] ABSTRACT

A shock load detection device mounted on a disk drive housing of a computer disk drive unit to issue a write-fault signal should the disk drive unit have a mechanical shock imposed thereon. The detection device includes three piezo-electric crystals mounted orthogonally between a base and a seismic mass. Any shock load along x, y, and z axes through the piezo-electric crystals produces an electrical charge which is amplified, filtered, and compared for issuring a write-fault signal. The write-fault signal is used to stop the writing of read/-write heads on a spindle of a head disk assembly before the shock imposed thereon could otherwise move the read/write heads off track causing a data error.

8 Claims, 2 Drawing Sheets

Y LEAD
Z LEAD
X LEAD
(Y LEAD)
(Z LEAD)
(X LEAD)
Y(+)
Y(−)
X(+)
X(−)
Z(+)
Z(−)
Y WRITE-FAULT SIGNAL
WRITE-FAULT SIGNAL
Z WRITE-FAULT SIGNAL
X WRITE-FAULT SIGNAL

Y-LEAD
Y WRITE-FAULT SIGNAL
VCC
Z LEAD
WRITE-FAULT SIGNAL
Z WRITE-FAULT SIGNAL
X LEAD
X WRITE-FAULT SIGNAL

SHOCK LOAD DETECTION DEVICE

BACKGROUND OF THE INVENTION

1. Field of the Invention

The present invention relates to the field of shock load detection equipment, and more particularly but not by way of limitation, to a shock load detection device for mounting on a computer disk drive unit for detecting a mechanical shock load imposed thereon and issuing a write-fault signal to stop the writing of read/write heads.

2. Discussion

Heretofore it is to be expected that a mechanical shock load can generate errors in the performance of a computer disk drive unit. If a mechanical shock occurs during a read operation, the read error resulting causes an error from the error detection circuitry. If the shock occurs during writing, the standard circuitry now used for error detection must reread the data written on the disk. Also, if a shock occurs, the read/write heads can move off track, destroying written data.

Production disk drive units now detect a mechanical shock by sensing when a servo head is driven off track. This sensing method is imperfect because the indication of a shock may come too late to prevent a write error. Further, the shock may cause a data head position error without any servo head position error detected Also, an off track error in the servo signal can occur for other reasons besides a mechanical shock.

As disk drive storage units become more compact and therefore more susceptible to error caused by shock and vibration, customer specifications also become more stringent. Therefore it becomes increasingly desirable to provide a shock detection system for a computer disk drive unit used in storing and reading data thereon.

Takewo Chiku, et al, U.S. Pat. No. 3,304,787 taught a three-dimensional accelerometer device using piezo resistive materials. The accelerometer is mounted on a moving body to be measured. A common intersection either coincides with a point on or within the moving body and is positioned adjacent another point whereby acceleration or deceleration exerted on or adjacent the common intersection point can be measured either in magnitude or direction.

Jones, et al., U.S. Pat. No. 4,088,907 taught the use of a piezo-electric acoustic emission device. The device is responsive both to compressional wave energy and to shear/wave energy from any direction along an x, y, and z axis so that the source of the acoustic emission may be determined.

In U.S. Pat. Nos. 3,363,471 to Lovelace, et al.; U.S. 3,853,000 to Barnett, et al.; 4,658,175 to Albert, 4,498,025 to Takahashi, 4,644,181 to Mosconi, et al.; and 3,137,834 to Pfann: various types of tranducers, accelerometers and measuring devices using piezo-electric crystals are described for measuring forces along three axial directions.

None of the above mentioned prior art devices provide the unique features and novel structure of the present invention as described herein.

SUMMARY OF THE INVENTION

The present invention provides a shock load detection device to detect a mechanical shock on a computer disk drive and to issue a write-fault signal before read/write heads of a head disk assembly move off track to an extent that data is lost. The shock load detector device is designed to fit in a disk drive housing and is capable of detecting shock levels as low as 3 to 8 g's with a precision of one-half g. A "g" is a measurement of the acceleration of gravity. The detection device includes a sensor for detecting a mechanical shock load imposed thereon and generating an electrical charge proportional to the mechanical shock load. The sensor is a tri-axial orthogonal sensor made up of piezo-electric crystals. A charge amplifier is connected to the sensor. A voltage amplifier is connected to the charge amplifier. The two amplifiers produce a voltage signal proportional to the electrical charge received from the sensor. A comparator which includes both a positive and a negative comparator is connected to the voltage amplifier for measuring both positive and negative voltage signals corresponding to both positive and negative mechanical shock within a predetermined range of g force. A write-fault signal is received from the comparator when the voltage signal corresponds to a valve within a predetermined range of g force. The write-fault signal allows for stopping the read/write heads.

An object of the present invention is to provide a shock load detection device for detecting shock load and vibration on a computer disk drive and measuring the g force of the shock.

Another object of the present invention is to issue a write-fault signal for stopping the writing on a read/write head prior to any written data being destroyed on the disk should the read/write head be driven off track.

Another object of the present invention is to read mechanical shock load imposed upon the housing of a computer disk drive unit along an x, y, and z axis so that any shock received thereon can be detected, measured and a necessary write-fault signal generated should the shock load fall within a predetermined range of g force.

Other objects, features and advantages of the present invention will be apparent from the following detailed description when read in conjunction with the drawings and appended claims.

DESCRIPTION

Figures 1, 2, 3:
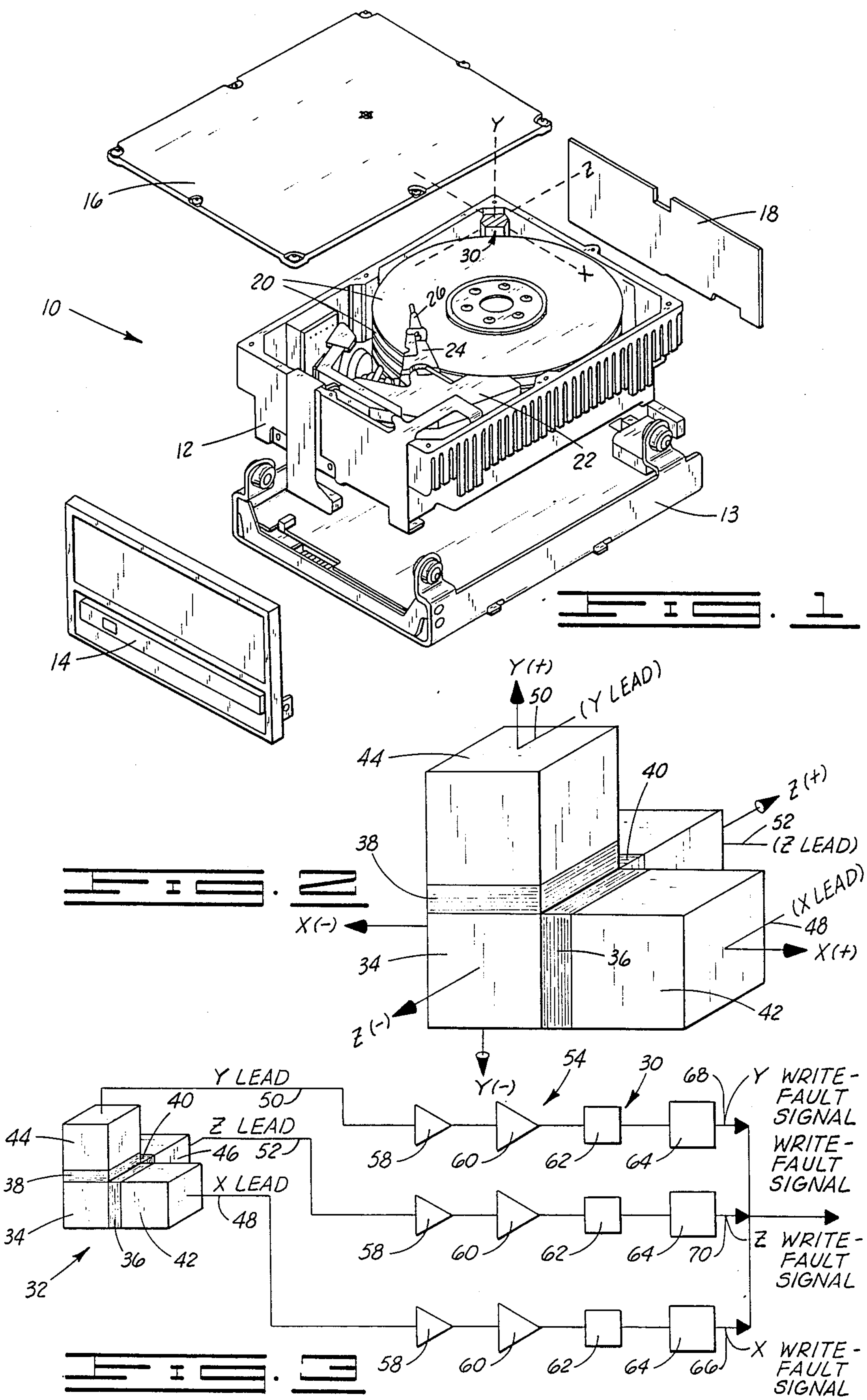
FIG. 1 is an exploded isometric view of a standard computer disk drive unit showing the present invention shock load detection device mounted on the disk drive housing.
FIG. 2 is an isometric view of a tri-axial sensor using piezo-electric crystals.
FIG. 3 illustrates a block diagram of the circuitry used in measuring mechanical shock load along the x, y, and z axis of the tri-axial sensor.

FIG. 1 illustrates an exploded isometric view of a standard computer disk drive unit designated by the general reference numeral 10. The computer disk drive unit 10 includes a disk drive housing 12 mounted on a housing carriage 13 along with a removable front panel 14, a top panel 16, and a rear panel 18. A plurality of rigid recording disks 20 are rotatably mounted in the housing 12 with a head disk assembly 22 mounted adjacent the disks 20. The head disk assembly 22 includes a spindle 24 with a plurality of read/write heads 26 attached thereto. While only one read/write head 26 is shown in FIG. 1, it will be understood that there is a read/write head 26 for reading and writing data on both sides of each rigid disk 20. For clarity of discussion herein, only the reading and writing of one read/write head 26 on a rigid disk 20 will be discussed, although the discussion of the present invention applies to the reading and writing on all of the rigid disks 20 simultaneously. Also, while the use of the shock load detection device of the present invention is discussed with the disk drive housing 12 having rigid disks 20 mounted therein, the detection device can certainly be used with floppy disks.

The shock load detection device of the present invention is designated by general reference numeral 30 and is shown in FIG. 1 mounted in one corner of the disk drive housing 12. The corner of the disk drive housing 12 is one place that room was sufficient for the detection device 30. Other locations would work equally well, such as attachment to the head disk assembly 22, if the necessary space is available. Also shown in dotted lines is an x axis, y axis, and z axis orthogonally disposed through the detection device 30. The three axes are shown to indicate that any mechanical shock or vibration placed on the disk drive unit 10 will be sensed and measured along one or more of these three axes, and a write-fault signal will be issued if the shock exceeds a predetermined g force value. If the write-fault signal occurs, writing by the read/write head 26 will be stopped prior to the read/write head being forced off track by the shock load and data being lost or destroyed.

FIG. 2 illustrates a tri-axial orthogonal sensor having the general reference numeral 32. The tri-axial sensor 32 is the part of the detection device 30 used to detect a shock load imposed on the disk drive unit 10 and to generate an electrical charge proportional to the shock load. To generate the necessary charge a cubic base 34 is used with three piezo-electric crystals attached thereto. The crystals are designated as an x piezo-electric crystal 36, a y piezo-electric crystal 38, and a z piezo-electric crystal 40. One surface of each crystal is attached to the cubic base 34 and perpendicular to its respective axis. The crystals are preferably made of a lead-zirconate-titanate ceramic, a material chosen for its high charge/voltage output. Each ceramic is composed of a multiple of crystals which are polarized by a DC current.

Attached to the opposite surface of the crystals 36, 38, and 40 is an x seismic mass 42, a y seismic mass 44, and a z seismic mass 46, respectively. The cubic base 34 and seismic masses 42, 44, and 46 are secured to the crystals 36, 38, and 40 using a conductive adhesive. An x lead 48 is connected to the x seismic mass 42 along the x axis through the center thereof for receiving both positive and negative charges along this axis. A y lead 50 and a z lead 52 are connected to the y and z seismic masses 44 and 46 respectively for receiving positive and negative charges along the y and z axis.

When the piezo-electric crystals 36, 38, and 40 are compressed or stretched due to a shock load or vibration, a charge appears on the polarized surfaces thereof. The charge is greatest when the compressive or tension force is parallel to either the x, y, or z axis and through the polarized surface of the crystal. The compressive force along each axis can be used to signal a positive charge, while a tension force placed on the crystals can be used to signal a negative charge. The electrical charge is proportional to the force placed on each crystal and not the stress thereon. Each of the crystals respond as a capacitor with a potential difference generated across the polarized surfaces.

The charge generated by each crystal 36, 38, and 40 is found from the following equation:

$$g=dF, \quad (1)$$

where g=charge, d=piezo-electric constant, and F=force on the individual crystal. The value of d for a lead-zirconate-titanate crystal is approximately 260 p Coulomb/Newton.

The voltage across the opposite surfaces of each crystal 36, 38, and 40 is found by the equation:

$$V=g/c, \quad (2)$$

where V=Voltage, g=charge on each crystal, and c=capacitance of the crystal.

The capacitance of each crystal 36, 38 and 40 is a function of its geometry and is in the order of 1000 pFarad. Since capacitance is a function of size, a reduction in size of the crystal for a given mass will produce a higher voltage output. Therefore, the higher the force on the crystal the higher the voltage.

The internal impedance of each crystal is quite high and on the order of 10+M ohms. Therefore the charge will remain on the surface of the crystal for a considerable period of time when a constant force is placed thereon. However, when measuring voltage at the surface of each crystal, an erroneous reading is received if the impedance as measured is not kept sufficiently high due to leakage through the system of a small amount of charge on the crystal. For low frequency measurements in a range of 10/msecond shock loads, the input impedance must be kept above 10M ohms to prevent undesirable leakage.

In FIG. 3 a block diagram is shown of an electrical circuit designated by general reference 54. The circuit 54 is part of the detection device 30 used to convert the charge received from the piezo-electric crystals 36, 38, and 40 via leads 48, 50 and 52 to a write-fault signal 56. Each of the leads 48, 50 and 52 are connected to identical circuit components which include a charge amplifier 58, a voltage amplifier 60, a low-pass filter 62 and a comparator 64. From each of the comparators 64, an x write-fault signal 66, a y write-fault signal 68, and a z write-fault signal 70 respectively issued. Any of the write-fault signals 66, 68 and 70, when in a predetermined range for measuring the "g" force on the disk drive unit 10, can institute the overall write-fault signal 56 to stop the writing of the read/write head 26. The electrical circuit 54 is designed to meet high impedance requirements received from the electric charges of the tri-axial sensor 32 as well as minute charges generated by shock loads as low as 3 g's.

Figure 4:
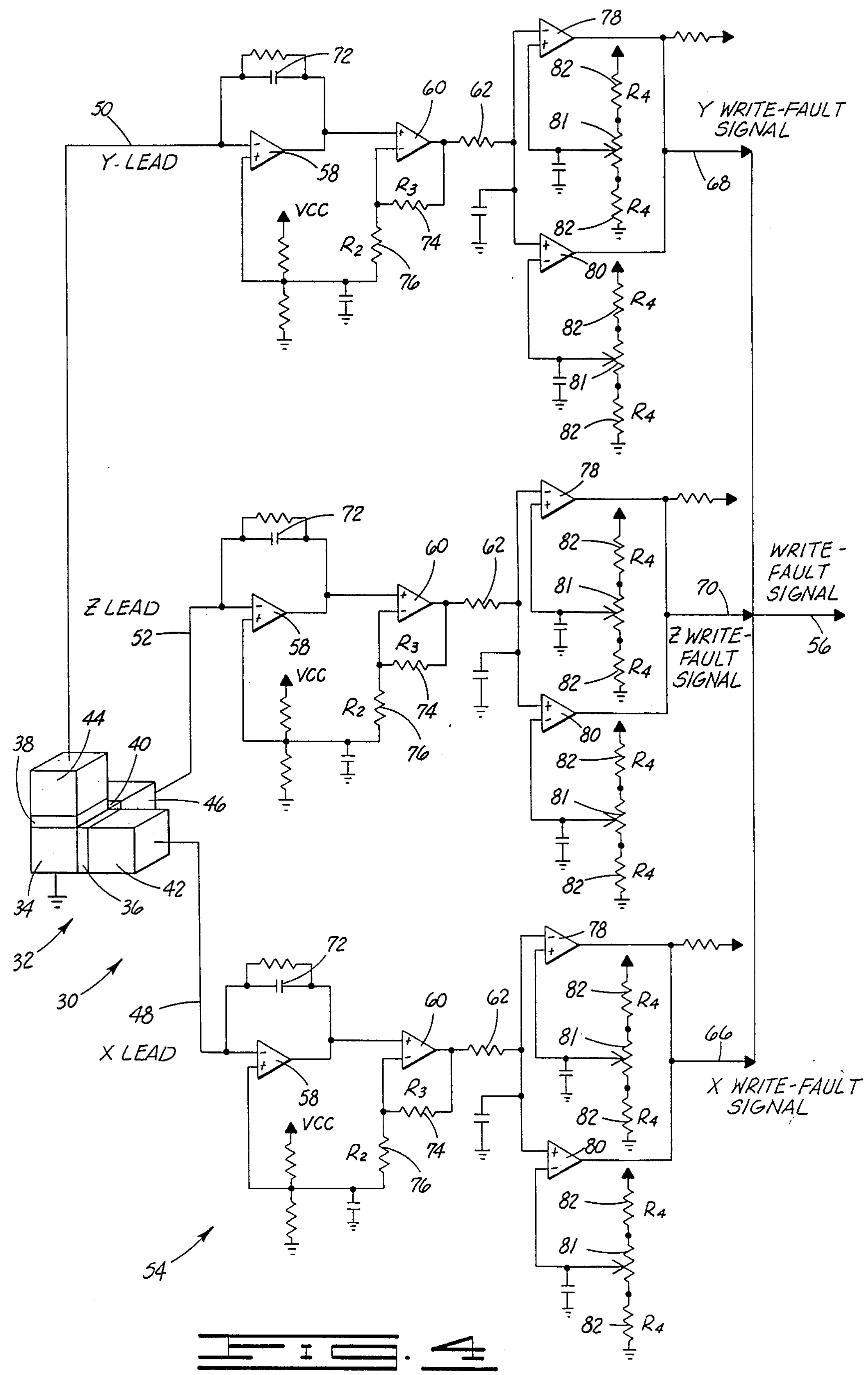
FIG. 4 illustrates a portion of the circuitry of the subject detection device connected to an x lead from the x axis of the tri-axial sensor.

Referring now to FIG. 4, the electrical circuit 54 connected to the tri-axial sensor 32 is shown in greater detail. In this diagram only the components connected to the x lead 48 are shown. The components connected to the y lead 50 and z lead 52 are the same as those connected to the x lead 48 for generating a y write-fault signal 68 and a z write-fault signal 70.

The charge amplifier 58 connected to the x lead 48 produces a voltage signal proportional to the charge received from the surface of the x piezo-electric crystal 36 and through the x seismic mass 42. The gain is set by adjusting the feedback capacitance of a capacitor 72 connected to the amplifier 58. For the piezo-electric crystals used in the tri-axial sensor 32 the optimum capacitance lays between 500 pF and 1000 pF with 820 pF used in the circuit 54. The gain received from the charge amplifier 58 is approximately 1. The output of the charge amplifier rides at ½ Vcc.

The voltage amplifier 60 connected to the charge amplifier 58 is set by adjusting the ratio between a feedback resistor R3 or numeral 74 to another resistor R2 or numeral 76. The two resistors 74 and 76 are both connected to the voltage amplifier 60 as shown. For the electrical circuit 54 a gain of 50 is used. The output of the voltage amplifier 60 also rides at ½ Vcc with the amplitude changing by approximately 250 mV per g received on the surface of the x piezo-electric crystal 36.

The low-pass filter 62 connected to the voltage amplifier 60 is set at 3000 Hz. The value of 3000 Hz is chosen by viewing the phase change of a charge amplifier system for different frequencies. The source for an analysis of the charge amplifier system can be found in a publication by Bryel and Kjar entitled "Piezo-electric Accelerometers and Vibration Preamplifiers". It has been determined in the present electrical circuit 54 there is no appreciable phase change between a 3000 Hz filter and using no filter in the circuit.

The comparator 64 is made up of a positive comparator 78 and a negative comparator 80 connected to the low-pass filter 62. The positive comparator 78 is set for a level above ½ Vcc for positive shock loads and the negative comparator 80 is set for a level below ½ Vcc for negative shock loads. The two comparators 78 and 80 are set by adjusting two 10 Kohm pots 81 to a desired level. In the circuit 54 if the Vcc is not kept constant levels of the comparators 78 and 80 will change. The range of the comparators 78 and 80 can be increased by reducing the value of the resistors R4 having numeral 82 or the range can be decreased by increasing the value of the resistors 82. By using the above values as described with each component and the Vcc set at 10V, a trigger level for generating the write-fault signal 56 can be set up to approximately 12 g's.

The above described tri-axial sensor 32 with electrical circuit 54 provide a unique detection device for mounting in a disk drive housing. The detection device 30 will stop the writing of a read/write head prior to a shock load or vibration moving a read/write off track heretofore causing data to be lost or destroyed.

It will be clear that the present invention is well adapted to carry out the objects and attain the advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims.

What is claimed is:

1. A shock load detection device mounted in a housing of a computer disk drive unit for measuring a mechanical shock imposed thereon and issuing a command signal to stop the writing of a read/write head should a predetermined g force be exceeded, the detection device comprising:

sensor means for detecting a mechanical shock load imposed thereon and generating an electrical charge proportional to the mechanical shock load;

amplifier means connected to the sensor means for producing a voltage signal proportional to the electrical charge received from the sensor means; and comparator means connected to the amplifier means for measuring the voltage signal and comparing the voltage signal within a predetermined range of g force values, a write-fault signal received from the comparator means when the voltage signal received by the comparator means falls within the predetermined range of g force for stopping the writing of the read/write head.

2. The detection device as described in claim 1 wherein the sensor means comprises a sensor characterized as a tri-axial orthogonal sensor for detecting a mechanical shock load impcsed thereon along on x, y, and z axes.

3. The detection device as described in claim 1 wherein the amplifier means comprises a charge amplifier connected to the sensor means and a voltage amplifier connected to the charge amplifier.

4. The detection device as described in claim 1 wherein the comparator means comprises a positive comparator and a negative comparator, the positive and negative comparator connected to the amplifier means for measuring both a positive and a negative voltage signal corresponding to a positive and a negative mechanical shock within the predetermined range of g force values.

5. The detection device as described in claim 1 further including a low pass filter connected between the amplifier means and comparator means.

6. A shock load detection device mounted in a housing of a computer disk drive unit for measuring a mechanical shock imposed thereon and issuing a command signal to stop the writing of a read/write head should a predetermined g force value be exceeded, the shock load detection device comprising:

tri-axial orthogonal sensor means for detecting a mechanical shock load imposed thereon along x, y, and z axes, the tri-axial orthogonal sensor means having an x electrical lead disposed along the x axis, a y electrical lead disposed along the y axis, and a z electrical lead disposed along the z axis;

an x amplifier, a y amplifier, and a z amplifier connected to the x, y, and z leads respectively producing a voltage signal proportional to the electrical charge received from the tri-axial sensor means; and an x comparator connected to the x amplifier, a y comparator connected to the y amplifier, and a z comparator connected to the z amplifier, the x, y, and z comparators measuring the voltage signal and comparing the voltage signal within a predetermined range of g force, an x write-fault signal, a y write-fault signal, and a z write-fault signal received from the x, y, and z comparators respectively when the voltage signals received from the x, y, and z comparators fall within a predetermined range of g force values for stopping the writing of the read/write head.

7. The detection device as described in claim 6 wherein the x, y, and z comparators include both a positive comparator and a negative comparator, the positive and negative comparators connected to the x, y, and z amplifiers respectively for measuring both positive and negative signals corresponding to both a positive and a negative mechanical shock with a predetermined range of g force received on the tri-axial orthogonal sensor.

8. The detection device as described in claim 6 wherein the tri-axial orthogonal sensor means comprises a base, an x piezo-electric crystal, a y piezo-electric crystal, and a z piezo electric crystal, the x, y, and z crystals attached to the base and orthogonally disposed thereon, and an x seismic mass, a y seismic mass, and a z seismic mass attached to the x, y, and z crystals respectively, the x, y, and z leads connected to the x, y, and z seismic masses respectively.

* * * * *